United States Patent
Lung et al.

(10) Patent No.: US 6,978,985 B2
(45) Date of Patent: Dec. 27, 2005

(54) MECHANISM TYPE NON-SECTIONAL LOCKING BUFFER DEVICE

(75) Inventors: Ching-Yung Lung, Hsin Chung (TW); Yun-Chin Su, Hsin Chung (TW)

(73) Assignee: Pro-Glory Enterprise Co., Ltd., Hsin Chung (TW)

( * ) Notice: Subject to any disclaimer, the term of this patent is extended or adjusted under 35 U.S.C. 154(b) by 0 days.

(21) Appl. No.: 10/685,575

(22) Filed: Oct. 16, 2003

(65) Prior Publication Data

US 2005/0082727 A1    Apr. 21, 2005

(51) Int. Cl.[7] .............................................. B60G 13/00
(52) U.S. Cl. ...................... 267/195; 267/202; 267/249; 267/275; 188/196 D
(58) Field of Search ................................ 267/195, 202, 267/203, 205, 208, 248, 249; 188/129, 134, 188/196 D, 300, 275; 297/362.14, 362.12, 297/361.1

(56) References Cited

U.S. PATENT DOCUMENTS

| | | | | |
|---|---|---|---|---|
| 3,046,055 A | * | 7/1962 | Martens | 297/362.14 |
| 3,127,788 A | * | 4/1964 | Martens | 188/129 |
| 3,350,135 A | * | 10/1967 | Martens | 297/362.14 |
| 3,356,411 A | * | 12/1967 | Homier et al. | 297/362.12 |
| 4,589,301 A | * | 5/1986 | Griner | 74/586 |
| 5,638,925 A | * | 6/1997 | Neumueller et al. | 188/134 |
| 6,112,867 A | * | 9/2000 | Mintgen et al. | 188/300 |

* cited by examiner

Primary Examiner—Matthew C. Graham
Assistant Examiner—Mariano Sy
(74) Attorney, Agent, or Firm—Bacon & Thomas

(57) ABSTRACT

A non-sectional locking buffer device. The device utilizes a screw ascending and descending principle as a buffering function, wherein ball bearings or outer screw grooves are configured on a central shaft of the buffer device to operate in coordination with inner screw grooves or ball bearings configured on an inner wall of a buffer chamber. The inner and outer screw mechanisms rely on slippage of the ball bearings in the screw grooves, to reduce a jolting force from repositioning or returning of an upright support, thereby reducing buffer malfunction.

3 Claims, 3 Drawing Sheets

MECHANISM TYPE NON-SECTIONAL LOCKING BUFFER DEVICE

BACKGROUND OF THE INVENTION (a) Field of the Invention

The present intention relates to a buffer device applicable for use in seats of traffic vehicles, grips used by handicapped, etc. Upon a chair-back or grip returning to a perpendicular state from an inclined state, the buffer device utilizes a mechanical screw type principle as a buffer function. In addition to averting injury from a jolting force from repositioning or returning of an upright support, also reduces buffer malfunction.

(b) Description of the Prior Art

Regarding a buffer structure of a conventional seat, a conical spring is configured within a buffer compartment, whereby one end clamps to a chair-back upright, and one end fastens to a frame of a chair seat, therewith utilizing a restoring force of the spring to allow a sitter to avail himself of an ascending descending buffer to lighten a load on vertebra of the sitter caused by a force from sitting-down. However, returning of an upright support utilizes an almost instant restoring force of the spring, and while this force does not constitute a danger to an adult, nevertheless, the jolting force from repositioning or returning of an upright support can easily cause injury to vertebra of children or elderly persons.

Furthermore, there are business operators who utilize oil pressure to accomplish effectiveness of a buffer device. However, an oil pressure buffer mechanism is relatively intricate, thus cost is relatively high, moreover, there is an apprehension of leaking oil. Upon a traffic vehicle catching fire because of outside influences, oil can foster rapid fire destruction of the traffic vehicle.

SUMMARY OF THE INVENTION

Accordingly, a primary objective of the present invention is to provide a buffer device that comprises a central shaft configured with ball bearings.

Inner screw grooves are configured on an inner wall of a buffer chamber, thereof providing grooves for the ball bearings of the central shaft to slip therein, and utilizing a screw ascending descending principle as a buffering function, thereby slowing down a jolting force from repositioning or returning of an upright support, and reducing buffer malfunction thereof.

Another objective of the present invention is to have outer screw grooves configured on one end of the central shaft of the buffer device, with the ball bearings configured on the inner wall of the buffer chamber, and utilizes the ball bearings slipping within the outer screw grooves of the central shaft to form the outer screw mechanism of the buffer function thereof.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
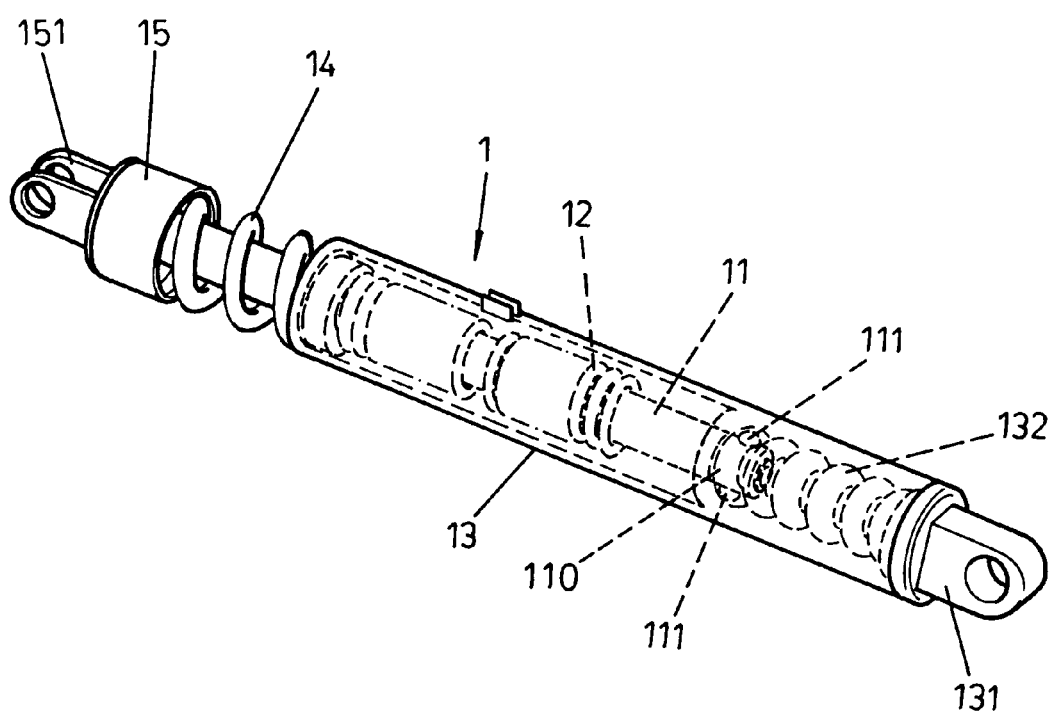
FIG. 1 shows an elevational view of a buffer device according to the present invention.
Figure 2:
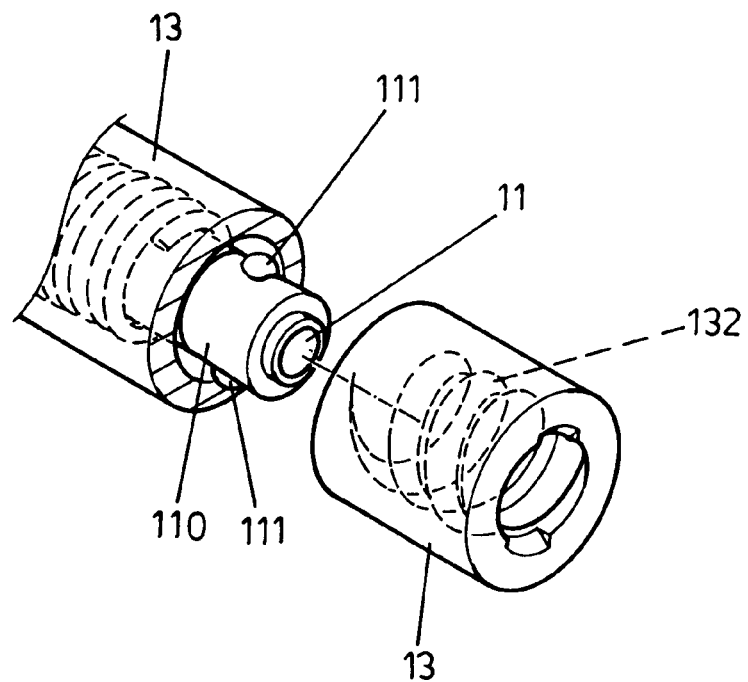
FIG. 2 shows an elevational structural view of an inner screw mechanism according to the present invention.
Figure 3:
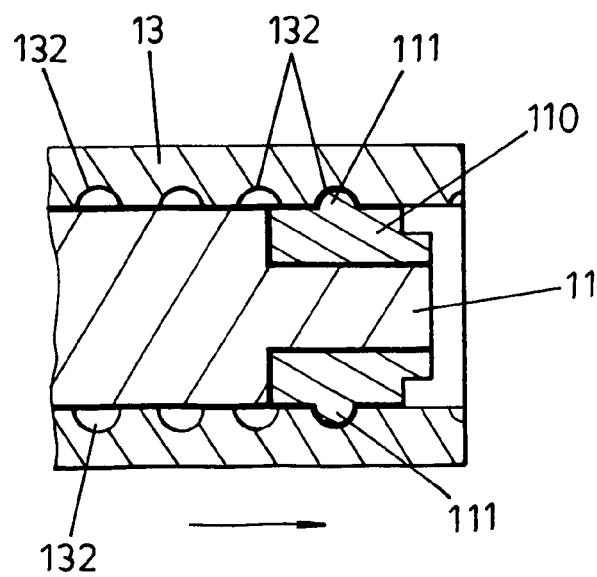
FIG. 3 shows a partial cross sectional view of the inner screw mechanism according to the present invention.

Referring to FIGS. 1, 2 and 3, which show one embodiment of the present invention installed below a chair cushion seat, and described hereinafter. A buffer 1 is assembled from structural elements comprising a central shaft 11, a torsion spring 12, a cylinder which defined a buffer chamber 13, a reposition spring 14 and a spring collar 15, wherein the torsion spring 12 is configured on the outer edge of the central shaft 11. The central shaft 11 and the torsion spring 12 are together disposed in the buffer chamber 13. A fixing mount 131 of one end of the buffer chamber 13 is enabled to bolt to a chair-back using a screw bolt, securely fixing thereof. Another end of the buffer chamber 13 is connected to the reposition spring 14, and another end of the reposition spring 14 engages with the spring collar 15. Securing lugs 151 of one end of the spring collar 15 bonds to a chair cushion frame thereof. The present invention is characterized in having:

More than one ball bearing 111 is configured on the central shaft 11. Referring to FIG. 3, which shows the ball bearings 111 configured on the sleeve shaft 110, the sleeve shaft 110 is further affixed to the central shaft 11, positionally securing thereof. Inner screw grooves 132 are configured on an inner wall of the buffer chamber 13. The inner screw grooves 132 thereby provide grooves for the ball bearings 111 configured on two laterals of the central shaft 11 to slip therein. Utilizing a screw ascending descending principle as a buffer function, number of the inner screw grooves 132 are configured to symmetrically match distribution in number of the ball bearings 111, wherewith a single screw groove, double screw grooves, triple screw grooves or even more screw grooves are adapted thereof. Design concept of the present invention consists of: when a screw thread efficiency is greater than 50% or a helix angle is larger than 45° or the helix angle is larger than an angle of friction suffice for:

$\theta > \tan^{-1}\mu$

θ: helix angle

μ: coefficient of friction of the screw grooves and heavy object

Upon occurrence of sliding down, there is a weight to bear along the central shaft 11, resulting in a self-slippage (self-spin) phenomenon.

By means of the aforementioned function, the central shaft 11 of the mechanism type locking device is impelled by force to move, whereupon the central shaft 11, having an applicable friction results, in a buffering effect (the buffer 1 according to the present invention has even more durability compared to a conventional central shaft, whereby the buffer 1 directly relies on interface frictional ware caused from back and forth slip friction produced between an abrasive proof material and a buffer chamber sleeving, thereby having advantages including enhancing applicable life of product and consistency in operational functionality).

Figure 4:
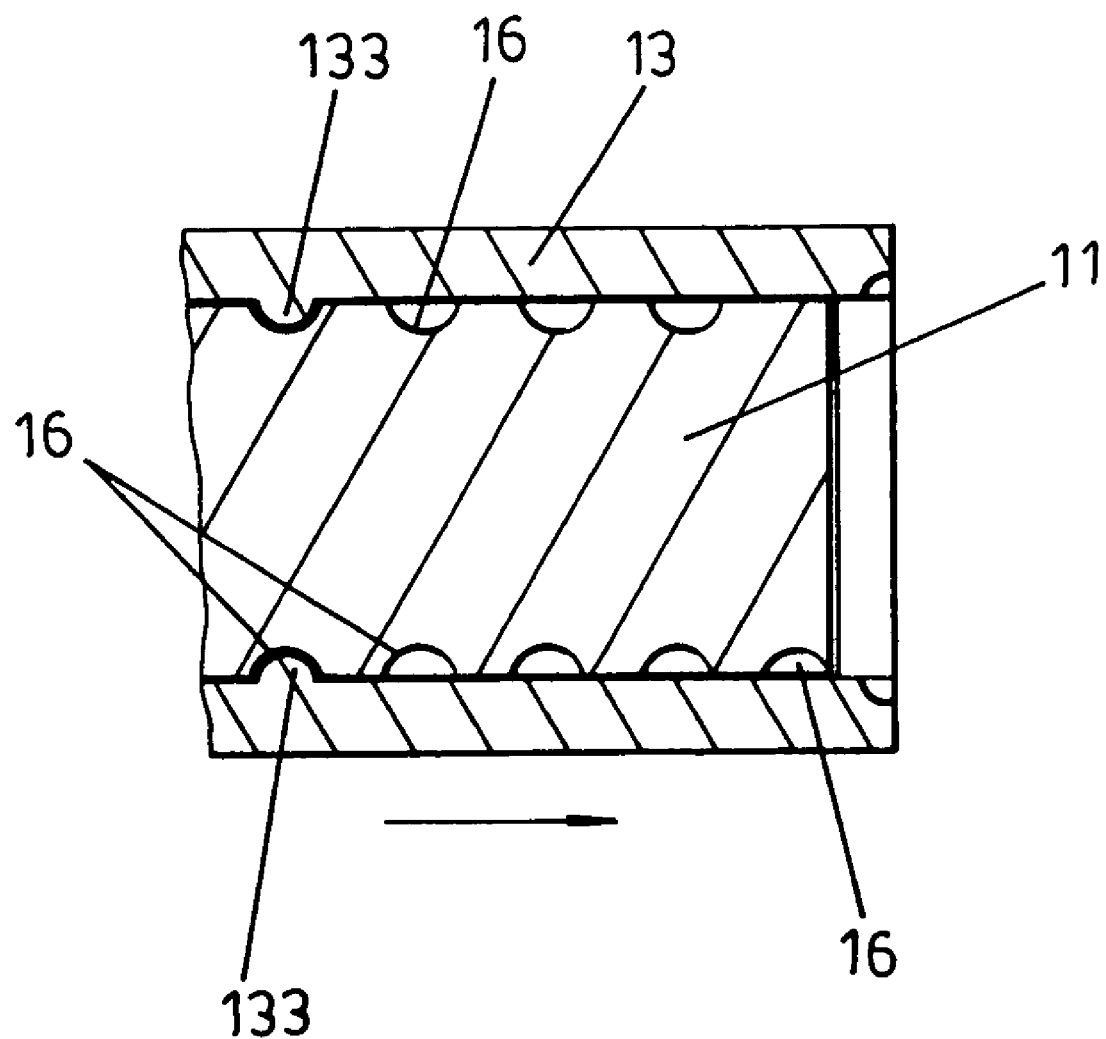
FIG. 4 shows a partial cross sectional view of an outer screw mechanism according to the present invention.

Referring to FIG. 4, which shows the present invention utilizing an outer screw mechanism, whereby outer screw grooves 16 are configured on the central shaft 11, and the ball bearings 133 are configured on an inner wall of the buffer chamber 13, thereby allowing the ball bearings 133 to slip within the outer screw grooves 16 of the central shaft 11.

Principle as applied in the aforementioned inner screw mechanism and outer screw mechanism: with regard to the screw, the helix angle, the friction and size variance of forward acting force, may be classified as hereinafter:

1. Self-locking type screw: whereby when a force impels the screw to rotate, and the heavy object is raised thereof or let down to a certain position, a rotating force is eliminated, and the heavy object, even though exerting a larger load on the screw shaft, still remains at a set position, and will not cause self-slipping up and down thereof. This class of screw mechanism pertains to a general vehicle-use jack or various kinds of general screws.

2, Self-slip type screw: whereby when the heavy object impels a force on the screw along the shaft, the heavy object will delay directional displacement impelled by the force thereof, and interfacial friction of the screw influences speed of displacement.

In conclusion, the present invention utilizes a screw ascending descending principle as the buffer function, and is applicable for use on chairs of traffic vehicles. When the inclined state of the chair-back recovers to the perpendicular state, the jolting force from repositioning or returning of an upright support of the chair-back is slowed down because of the buffer function, thereby preventing vertebra injury to a child or elderly person, as well as reducing buffer malfunction.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A non-sectional locking buffer device, comprising:
   a cylinder having an inner surface which defines a buffer chamber, said buffer chamber having spaced apart ends;
   a central shaft defining an outer surface;
   a torsion spring mounted to said central shaft on its outer surface, both said central shaft and said torsion spring being mounted in said buffer chamber between said spaced apart ends;
   a spring collar located adjacent one of said spaced apart ends;
   a reposition spring located between said spring collar and said cylinder; and
   a plurality of ball bearings located in said buffer chamber adjacent to said torsion spring at the other end of said spaced apart ends, wherein:
   screw grooves are provided in one of: said outer surface of said central shaft, and said inner surface of said cylinder, in which said plurality of ball bearings are engaged, utilizing a screw ascending and descending principle as a buffer function.

2. The non-sectional locking buffer device as claimed in claim 1, further comprising:
   a sleeve shaft affixed to and positionally secured to said central shaft, wherein:
   the ball bearings are mounted on said sleeve shaft.

3. The non-sectional locking buffer device as claimed in claim 1, wherein:
   said screw grooves are configured as outer screw grooves at one end of said central shaft, and the ball bearings are configured in the wall of the cylinder defining said buffer chamber, thereby allowing the ball bearings to slip within said outer screw grooves.

* * * * *